(12) United States Patent
Buchanan et al.

(10) Patent No.: US 9,316,860 B2
(45) Date of Patent: Apr. 19, 2016

(54) ELECTRONIC DEVICE DISPLAY WITH DAMAGE-RESISTANT POLARIZER

(71) Applicant: Apple Inc., Cupertino, CA (US)

(72) Inventors: Nicholas C. Buchanan, San Jose, CA (US); Brian H. Thornton, Mountain View, CA (US); Cheng Chen, San Jose, CA (US); Craig S. Gilden, San Jose, CA (US); Jun Qi, Cupertino, CA (US); Nicholas G. Roland, San Jose, CA (US); Victor H. Yin, Cupertino, CA (US); Zhibing Ge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 14/137,383

(22) Filed: Dec. 20, 2013

(65) Prior Publication Data

US 2015/0177562 A1    Jun. 25, 2015

(51) Int. Cl.
*G02F 1/1335*    (2006.01)
*G02B 5/30*    (2006.01)
*G02B 1/111*    (2015.01)

(52) U.S. Cl.
CPC .......... *G02F 1/133528* (2013.01); *G02B 1/111* (2013.01); *G02B 5/305* (2013.01)

(58) Field of Classification Search
CPC .................................................. G02F 1/133528
See application file for complete search history.

(56) References Cited

U.S. PATENT DOCUMENTS

| | | | |
|---|---|---|---|
| 5,625,474 A | 4/1997 | Aomori et al. | |
| 6,147,738 A * | 11/2000 | Okamoto | 349/122 |
| 8,508,680 B2 | 8/2013 | Geaghan et al. | |
| 8,619,212 B2 | 12/2013 | Asano et al. | |
| 2004/0104900 A1 | 6/2004 | Bang et al. | |
| 2004/0114248 A1* | 6/2004 | Hokazono | G02B 1/111 359/603 |
| 2006/0164860 A1 | 7/2006 | Muraoka et al. | |
| 2006/0215079 A1* | 9/2006 | Suzuki et al. | 349/96 |
| 2009/0059136 A1 | 3/2009 | Okamura | |
| 2009/0290105 A1* | 11/2009 | Takada | 349/96 |
| 2011/0304801 A1* | 12/2011 | Shibata | 349/96 |
| 2012/0033155 A1 | 2/2012 | Asano et al. | |
| 2013/0027641 A1* | 1/2013 | Kodama et al. | 349/96 |

* cited by examiner

*Primary Examiner* — Wen-Ying P Chen
(74) *Attorney, Agent, or Firm* — Treyz Law Group, P.C.; G. Victor Treyz; Joseph F. Guihan

(57) ABSTRACT

A display polarizer may have a polymer layer such as a polyvinyl alcohol layer coated with a dichroic dye such as iodine. A polymer layer such as a tri-acetyl cellulose layer may be formed on the polyvinyl alcohol layer so that the iodine is interposed between the polyvinyl alcohol layer and the tri-acetyl cellulose layer. To provide protection for the iodine layer, an additional polymer layer such as an additional tri-acetyl cellulose layer and a layer of adhesive may be formed on top of the polymer layer. A functional layer such as an antireflection layer may form an outermost layer in the polarizer. Compensation films may be formed beneath the polyvinyl alcohol layer. Additional display layers such as a lower polarizer layer and interposed layers such as a thin-film transistor layer, liquid crystal layer, and color filter layer may be formed below the compensation films.

15 Claims, 9 Drawing Sheets

ELECTRONIC DEVICE DISPLAY WITH DAMAGE-RESISTANT POLARIZER

BACKGROUND

This relates generally to electronic devices and, more particularly, to electronic devices with displays.

Electronic devices often include displays. For example, cellular telephones, computers, and televisions have displays.

Displays often include polarizer layers. For example, a liquid crystal display may have a liquid crystal layer and other layers that are sandwiched between an upper polarizer and a lower polarizer. An antireflection coating may be formed on top of the upper polarizer.

When electronic devices with displays are used in the field, there is a potential for exposure to foreign particles of material such as dirt particles, food crumbs, sand, or other particles of material. If care is not taken, foreign particles can damage a display. For example, if a foreign particle is compressed between a laptop computer base and its display, an upper polarizer layer on the display may be damaged. This damage can appear as an undesired white spot on the display.

It would therefore be desirable to be able to provide electronic devices with displays exhibiting enhanced resistance to damage from exposure to foreign particles.

SUMMARY

An electronic device may be provided with a display. The display may have a polarizer. The polarizer may form an upper polarizer in a pair of polarizers. Display layers such as a thin-film transistor layer, a color filter layer, and a liquid crystal layer may be interposed between the pair of polarizers.

The upper polarizer may have a polymer layer such as a polyvinyl alcohol layer coated with a dichroic dye such as iodine. A polymer layer such as a tri-acetyl cellulose layer may be formed on the polyvinyl alcohol layer so that the iodine is interposed between the polyvinyl alcohol layer and the tri-acetyl cellulose layer. To provide protection for the iodine layer and therefore avoid white spots due to iodine layer damage from localized foreign particle pressure, an additional polymer layer such as an additional tri-acetyl cellulose layer and a layer of adhesive may be formed on top of the polymer layer.

A functional layer such as an antireflection layer may form an outermost layer in the upper polarizer. Compensation films may be formed beneath the polyvinyl alcohol layer. Display layers such as a lower polarizer layer and interposed layers such as a thin-film transistor layer, liquid crystal layer, and color filter layer may be formed below the compensation films.

DETAILED DESCRIPTION

Electronic devices may be provided with displays. The displays may include polarizers. To help prevent damage to a display that might result in undesirable visible artifacts on the display, the display may be provided with a configuration that helps prevent sensitive layers such as a polyvinyl alcohol layer and an iodine coating on the polyvinyl alcohol layer from experiencing localized pressure due to the presence of foreign particles on the surface of the display.

Illustrative electronic devices of the types that may be provided with displays having polarizers with damage-resisting structures are shown in FIGS. 1, 2, 3, and 4.

Figure 1:
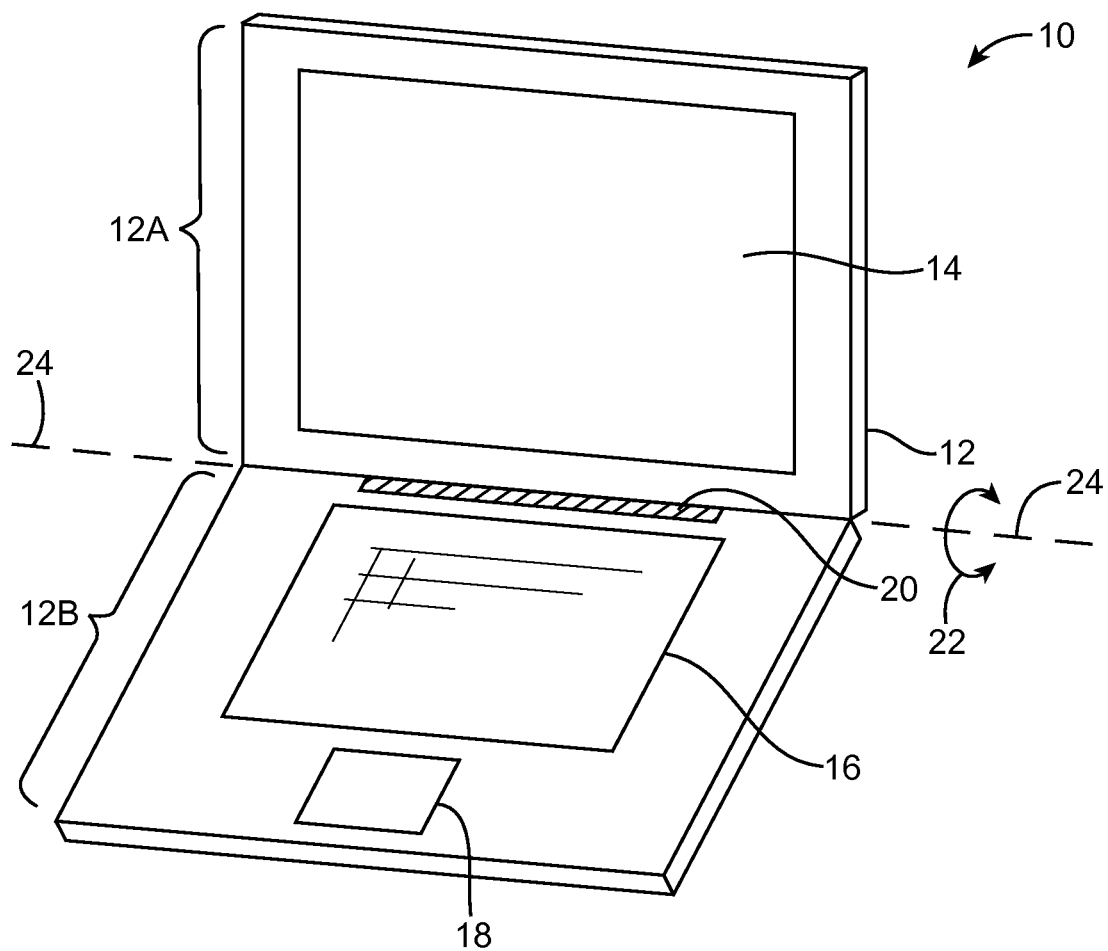
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
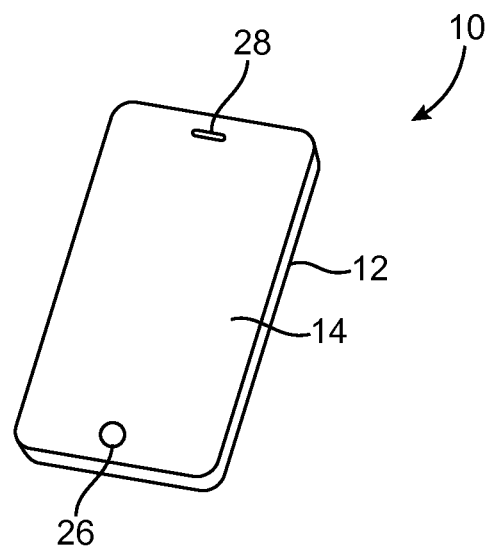
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
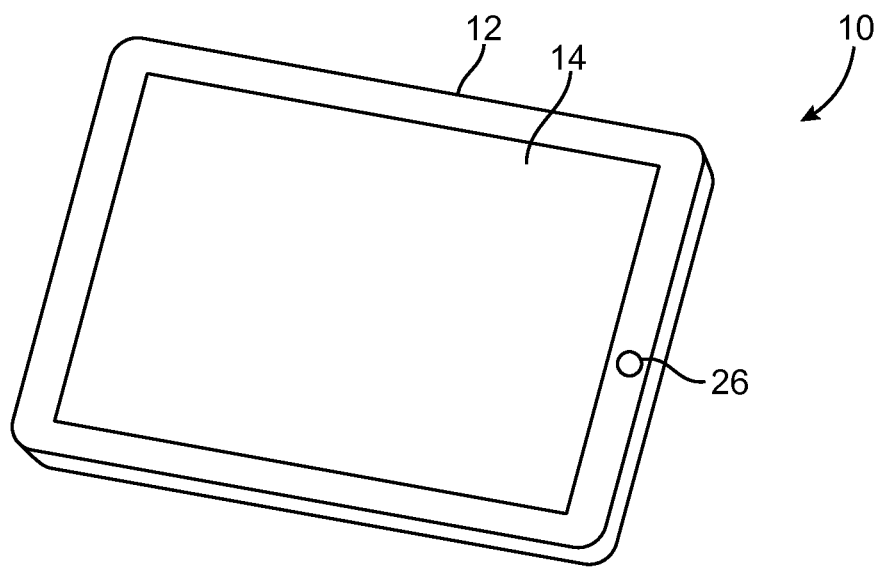
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
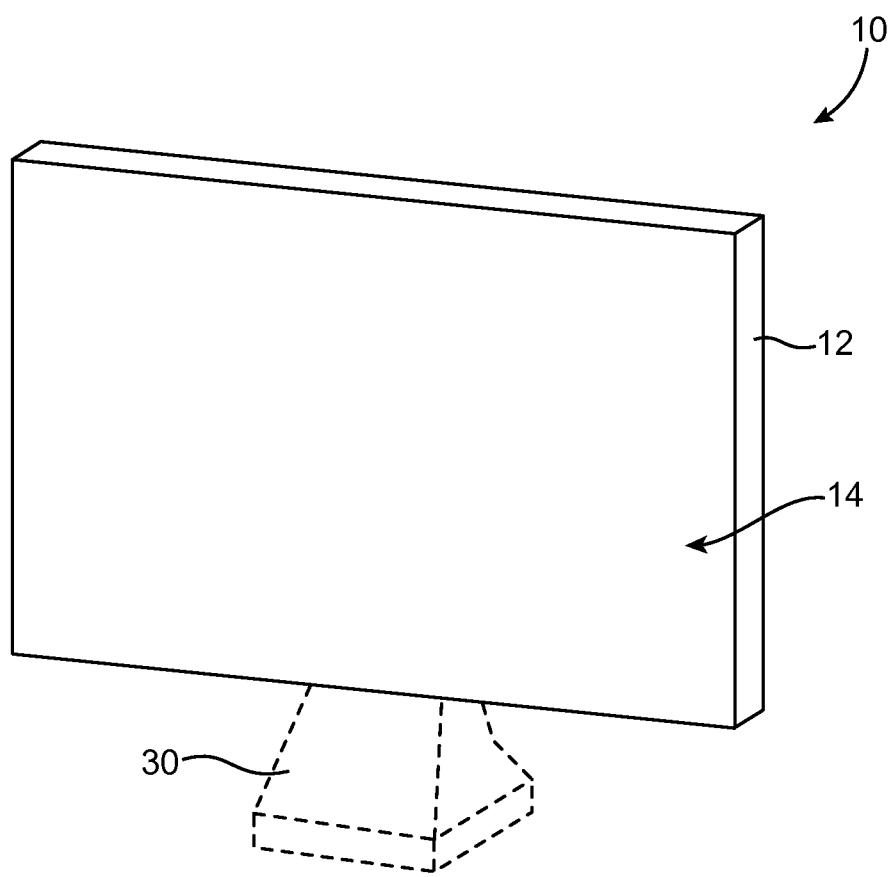
FIG. 4 is a perspective view of an illustrative electronic device such as a display for a computer or television with display structures in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a table top or desk.

Display 14 may be a liquid crystal display, an organic light-emitting diode display, a plasma display, an electrophoretic display, an electrowetting display, a display using other types of display technology, or a display that includes display structures formed using more than one of these display technologies. Display 14 may include one or more polarizers. For example, an organic light-emitting diode display may include a circular polarizer, a liquid crystal display may have upper and lower polarizers, etc. Configurations for display 14 in which display 14 is a liquid crystal display are sometimes described herein as an example. This is merely illustrative. Display 14 may be formed using any suitable type of display technology.

Figure 5:
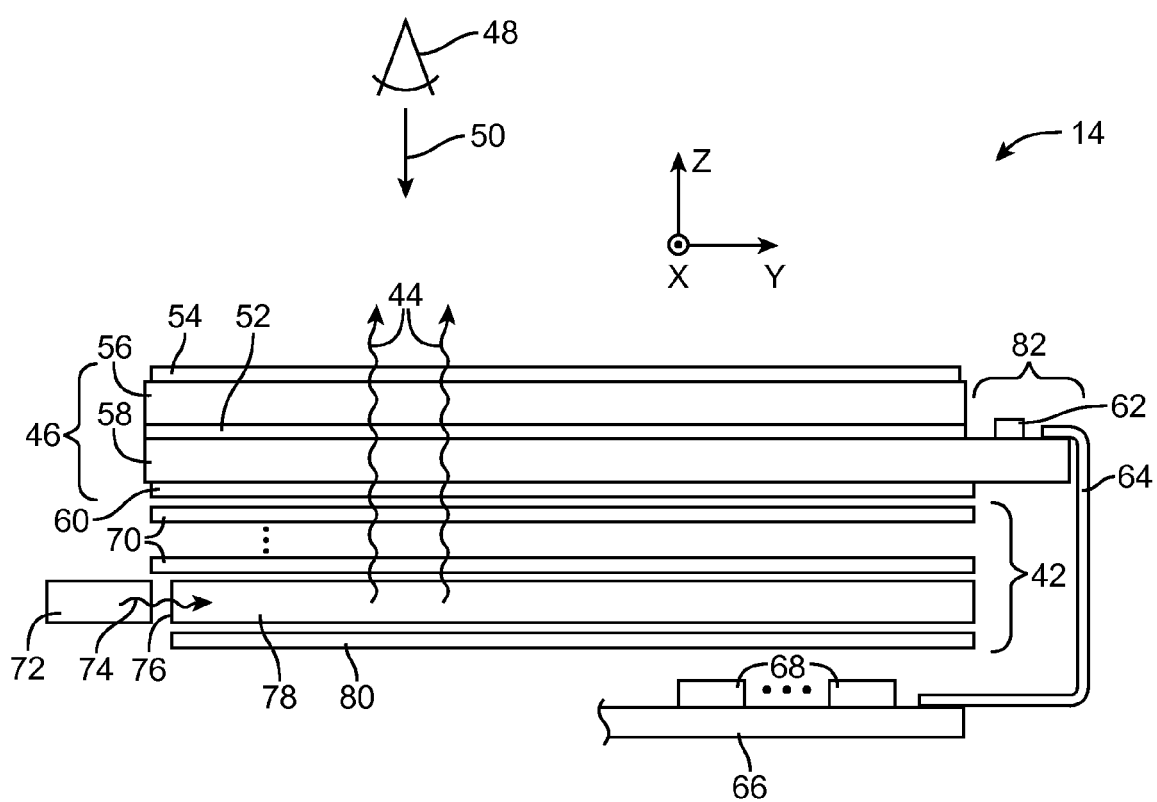
FIG. 5 is a cross-sectional side view of an illustrative display in accordance with an embodiment.

A cross-sectional side view of an illustrative configuration for display 14 of device 10 (e.g., a liquid crystal display for the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower (innermost) polarizer layer 60 and upper (outermost) polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits on a printed circuit such as integrated circuits 68 on printed circuit 66) may be used to generate information to be displayed on display 14 (e.g., display data). The information to be displayed may be conveyed to display driver circuitry such as display driver integrated circuit 62 using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
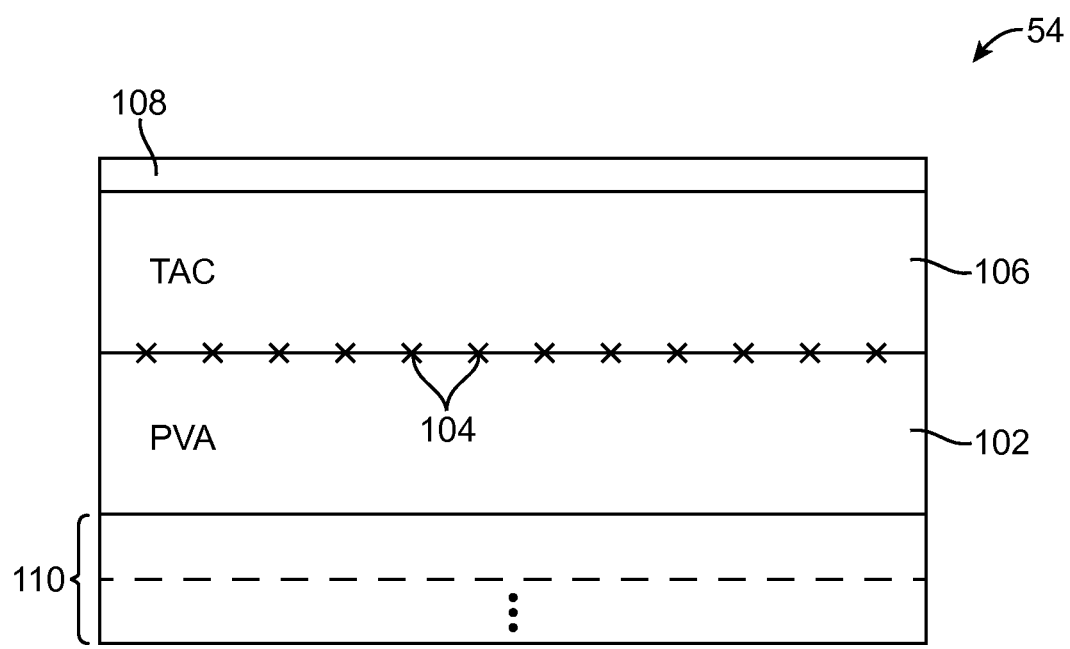
FIG. 6 is a cross-sectional side view of layers in an illustrative polarizer in accordance with an embodiment.

Polarizers such as upper (outermost) polarizer 54 and lower (innermost) polarizer 60 may include a polarizer layer covered with a dichroic layer. As shown in the cross-sectional side view of FIG. 6, polarizer 54 (i.e., an upper polarizer in this example) may have a polymer layer such as polarizer film (layer) 102. Film 102 may be formed from a stretched polymer such as stretched polyvinyl alcohol (PVA) and may therefore sometimes be referred to as a PVA layer. A dichroic dye such as iodine 104 or dichroic organic pigments may be placed on the stretched PVA film to provide polarizer 54 with the ability to polarizer light. When layer 102 is coated with iodine 104, iodine molecules align with the stretched film and form the polarizer. Other polarizer films may be used if desired.

One or more additional polymer layers may be attached to polarizer film 102. For example, layer 102 may be covered with one or more layers such as protective layer 106 and may have a functional layer 108. Layer 108 may be the outermost layer in polarizer 54 (and display 14). Layers such as protective layer 106 may be formed from a clear polymer. For example, layer 106 may be formed from a material such as tri-acetyl cellulose (TAC) and may sometimes be referred to as a TAC film. The TAC layer or other supporting substrate may help support and protect the PVA film. Functional layer 108 may include one or more layers of organic and/or inorganic material that serve as an antireflection coating, antismudge coating, or antiscratch coating (e.g., a hard coat layer), or may have layers that serve two or more such functions. Other films may be laminated to film 102 if desired. For example, lower film(s) 110 may be formed from one or more compensation films (i.e., birefringent films such as cyclic olefin polymer films that help enhance off-axis viewing performance for display 14). Interposed adhesive layers may be used to hold some or all of the layers of material in polarizer 54 and other portions of display 14 together.

Foreign particles such as particles of dirt, food, sand, or other materials may gather on the surface of display 14 during normal use of device 10 by a user. If care is not taken, foreign particles may be pressed into the surface of polarizer 54. When a foreign particle is pressed into polarizer 54 in this way, there is a potential for localized pressure to be exerted on PVA film 102 that disrupts layer 104. Local disturbances to film 102 and resulting localized damage to layer 104 can give rise to undesired white spots or other visible artifacts on display 14.

Figure 7:
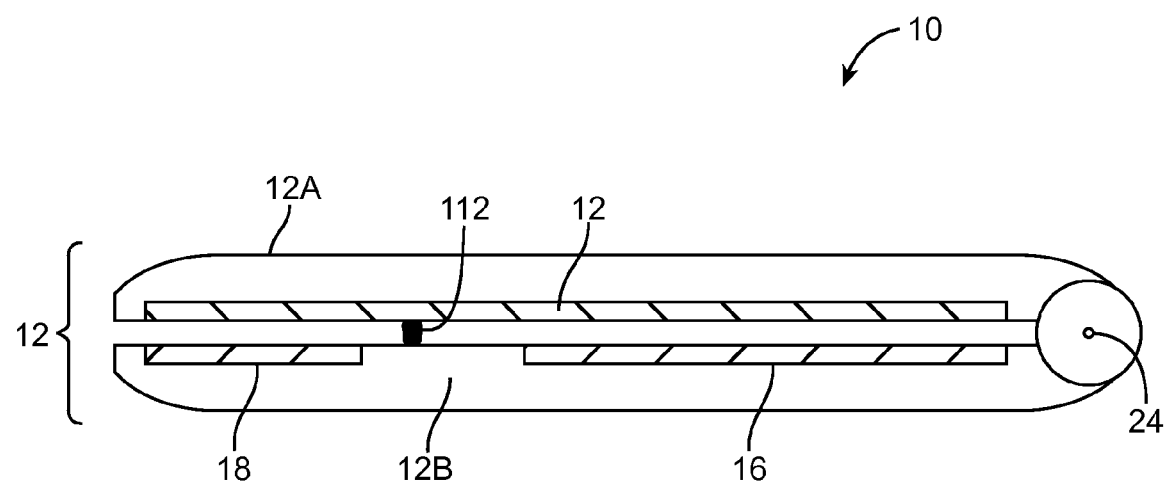
FIG. 7 is a cross-sectional side view of an electronic device having a hinged lid that is compressing a foreign particle between a base structure and the exposed outer surface of a display in accordance with an embodiment.

The possibility for damage to display 14 can be exacerbated when device 10 has a hinged lid such as lid 12A of the laptop computer of FIG. 1. A cross-sectional side view of laptop computer 10 is shown in FIG. 7. As shown in FIG. 7, lid 12A may be placed in a closed position against lower housing 12B. In this configuration, foreign particles such as particle 112 may be trapped between housing 12A and display 14 in lid 12A. Particle 112 may press against the surface of display 14 and may potentially damage the polarizer structures of display 14.

Figure 8:
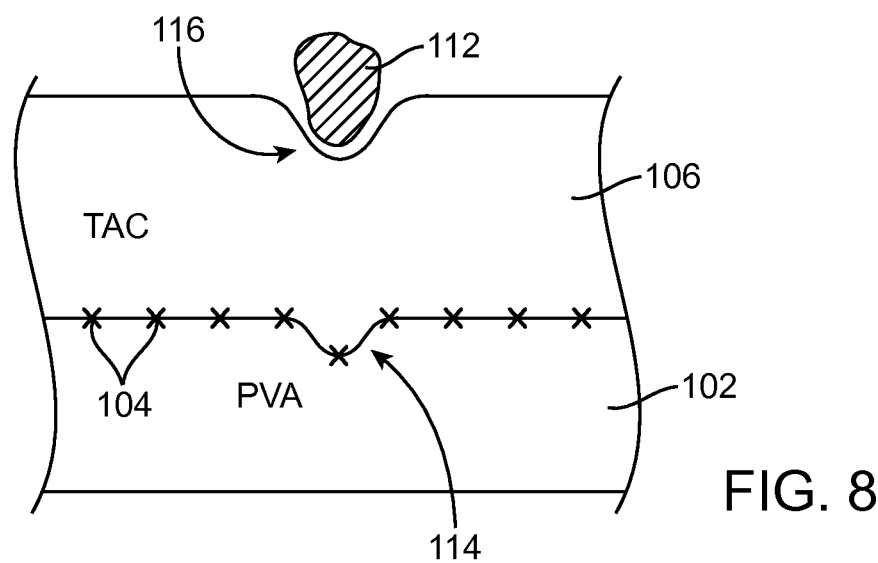
FIG. 8 is a cross-sectional side view of a portion of a display in which a foreign particle is generating damage to a polarizer layer.

Consider, as an example, the scenario of FIG. 8. As shown in the cross-sectional side view of FIG. 8, particle 112 may press against polarizer structures such as TAC layer 106. This may create an indentation such as indentation 116 in the surface of TAC layer 106. In an illustrative configuration for a polarizer, the TAC layer may have a thickness of 40 microns. This thickness is sufficiently thin that the force that is exerted on the upper surface of TAC layer 106 in the vicinity of indentation 116 is transferred to underlying PVA layer 102 and results in indentation 114 in PVA layer 102. An indentation such as indentation 114 may be significant enough to damage the iodine layer on PVA layer 102 so that the polarizer exhibits a visible white spot where indentation 114 is formed.

Figure 9:
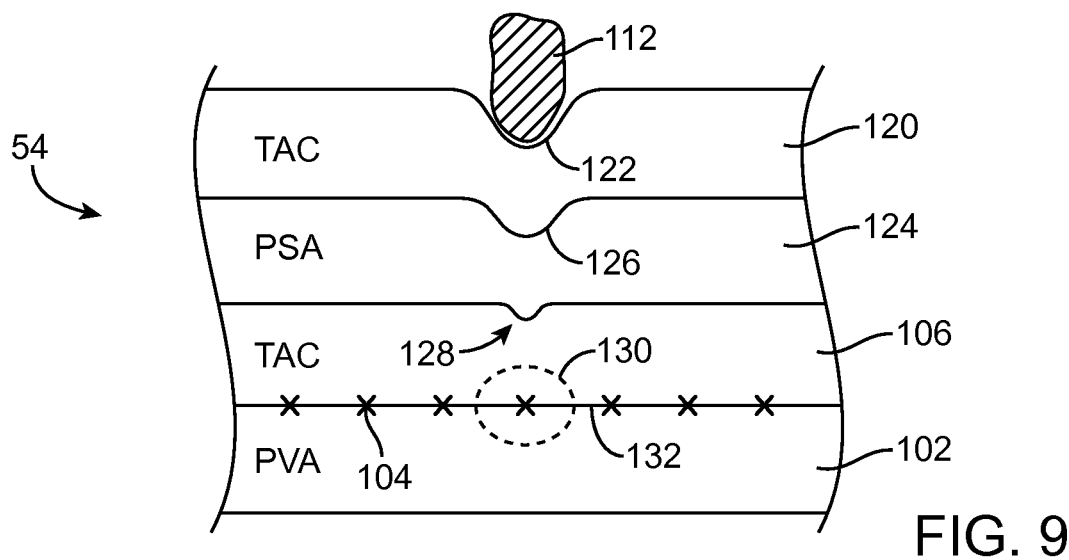
FIG. 9 is a cross-sectional side view of a portion of a display that is resistant to foreign particle damage in accordance with an embodiment.

FIG. 9 is a cross-sectional side view of a polarizer with an illustrative configuration for reducing or eliminating visible artifacts such as white spots in the presence of surface particle 112. As shown in FIG. 9, polarizer structures for polarizer 54 may be provided with additional protective layers such as additional layers 120 and 124. Layer 120 may be, for example, a polymer layer such as a TAC layer. Layer 124 may be a layer of pressure sensitive adhesive or other soft layer (e.g., a layer of optically clear adhesive that is preferably softer than TAC layer 120). With this type of configuration, particle 112 may press against the surface of TAC layer 120, creating indentation 122. Layer 120 may have a thickness that is sufficiently thin to allow force associated with the creation of indentation 122 to be transferred to pressure sensitive adhesive layer 124. As a result, an indentation such as indentation 126 may be formed in pressure sensitive adhesive layer 124 that corresponds to indentation 122 in TAC layer 120. Pressure sensitive adhesive layer 124 is preferably soft and viscous and therefore flows laterally under the pressure exerted by indentation 126. Due to the soft and viscous properties of pressure sensitive adhesive layer 124, pressure sensitive adhesive layer 124 only weakly transfers force from indentation 126 vertically downward to TAC layer 106. Because little or no force is exerted on TAC layer 106, only a minimal amount of indentation is created in the surface of TAC layer 106, as illustrated by the small size of indentation 128 in FIG. 9. TAC layer 106 transfers some of the force associated with small indentation 128 downwards to PVA layer 102, but because the amount of force associated with small indentation 128 is minimal, there is little or no resulting deformation of surface 132 of PVA layer 102. The polarizer formed from PVA layer 102 and TAC layer 106 (and from the iodine layer or other dichroic dye layer on PVA film 102) is therefore defect free in area 130, despite the presence of particle 122 on the surface of upper TAC layer 120.

Figure 10:
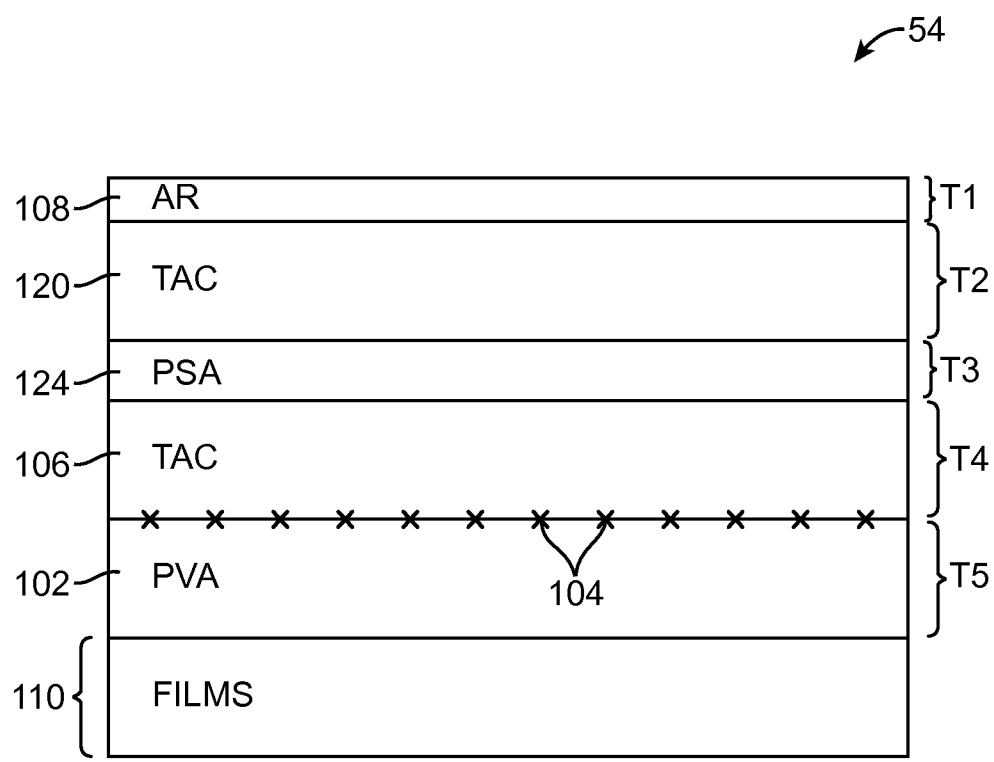
FIG. 10 is a cross-sectional side view of layers associated with a polarizer that is resistant to foreign particle damage in accordance with an embodiment.

If desired, the protective arrangement of FIG. 9 can be incorporated into a polarizer of the type shown in FIG. 10. As shown in the cross-sectional side view of FIG. 10, polarizer 54 of FIG. 10 has a functional layer 108 such as an antireflection coating or other functional layer. Layer 108 may be formed from inorganic layers such as silicon oxide, metal oxides such as aluminum oxide, or other inorganic materials, may be formed from one or more organic layers, etc. (as an example). Films 110 may include compensation films and adhesive to attach the compensation films to each other and to the lower surface of PVA layer 102.

Iodine 104 or other dichroic dye may be formed on PVA layer 102, between PVA layer 102 and TAC layer 106. Pressure sensitive adhesive layer 124 and additional TAC layer 120 may form a protective layer that helps prevent damage from particles on display 14 from damaging iodine layer 104 and PVA layer 102. Functional layer 108 may be formed as a coating on the surface of TAC layer 120.

With one suitable arrangement, functional coating 108 may have a thickness T1 of about 7 microns (e.g., less than 10 microns, more than 4 microns, 4-10 microns, or other suitable thickness). TAC layer 120 may have a thickness T2 of about 40 microns (e.g., less than 80 microns, less than 60 microns, less than 50 microns, more than 20 microns, more than 30 microns, 20-80 microns, 20-60 microns, 30-50 microns, or other suitable thickness). Pressure sensitive adhesive layer 124 may have a thickness T3 of about 20 microns (e.g., less than 40 microns, less than 30 microns, more than 10 microns, more than 5 microns, 5-40 microns, 10-30 microns, or other suitable thickness). TAC layer 106 may have a thickness T4 of about 40 microns (e.g., less than 80 microns, less than 60 microns, less than 50 microns, more than 20 microns, more than 30 microns, 20-80 microns, 20-60 microns, 30-50 microns, or other suitable thickness). The thicknesses T2 and T4 of respective TAC layers 120 and 106 may be equal, may differ by less than 10% with respect to each other, may differ by less than 25% with respect to each other, may differ by more than 25% with respect to each other, or may have other suitable thicknesses (as examples). PVA layer 102 may have a thickness T5 of about 22 microns (e.g., less than 40 microns, less than 30 microns, more than 5 microns, more than 10 microns, 10-40 microns, 15-30 microns, or other suitable thickness).

Figure 11:
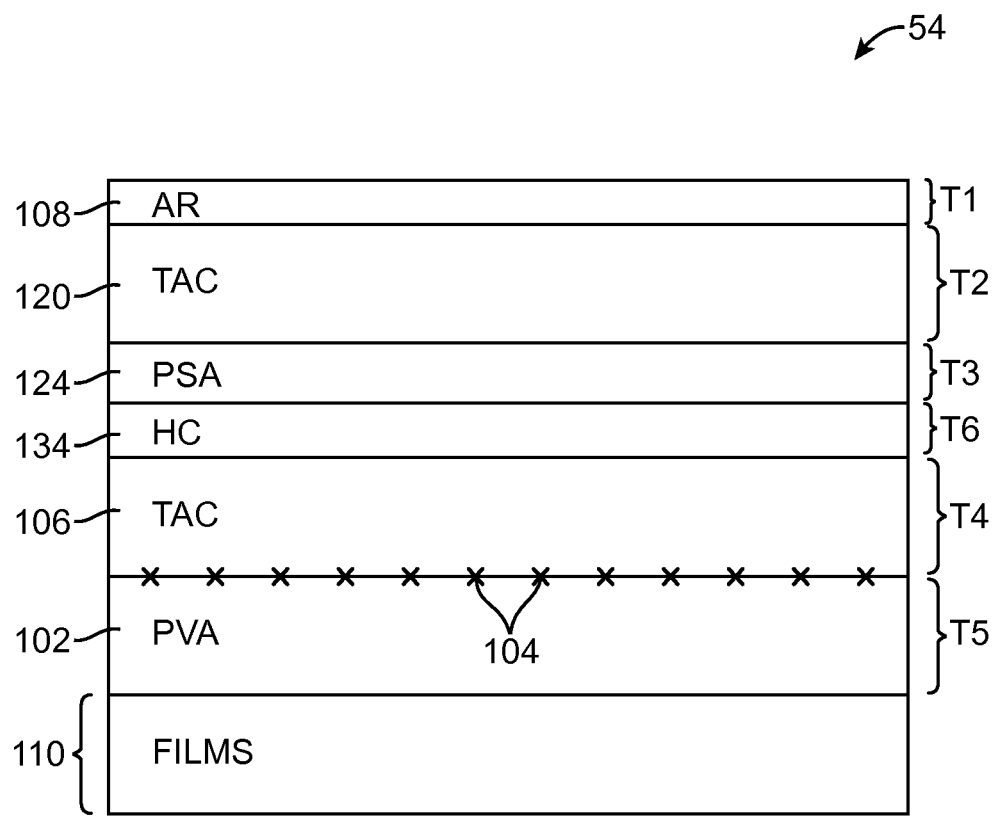
FIG. 11 is a cross-sectional side view of an alternative set of layers associated with a polarizer that is resistant to foreign particle damage in accordance with an embodiment.

Films such as TAC films may be incorporated into polarizer 54 that have hard coat layers. A hard coat layer may be formed from an inorganic or organic thin film that provides the underlying TAC film with abrasion resistance. An illustrative polarizer configuration of this type is shown in FIG. 11. As with polarizer 54 of FIG. 10, polarizer 54 of FIG. 11 may have has a functional layer 108 such as an antireflection coating or other functional layer. Layer 108 may be formed from inorganic layers and/or inorganic layers. Films 110 may include compensation films and adhesive to attach the compensation films to each other and to the lower surface of PVA layer 102.

Iodine 104 or other dichroic dye may be formed on PVA layer 102 of FIG. 11, between PVA layer 102 and TAC layer 106. Pressure sensitive adhesive layer 124 and additional TAC layer 102 may form a protective layer that helps prevent damage from particles on display 14 from damaging iodine layer 104 and PVA layer 102. Functional layer 108 may be formed as a coating on the surface of TAC layer 120.

In the FIG. 11 configuration, TAC layer 106 has a functional coating such as hard coat layer 134 of thickness T6. The value of thickness T6 may be about 7 microns (e.g., less than 10 microns, more than 4 microns, 4-10 microns, or other suitable thickness). Functional coating 108 may have a thickness T1 of about 7 microns (e.g., less than 10 microns, more than 4 microns, 4-10 microns, or other suitable thickness). TAC layer 120 may have a thickness T2 of about 40 microns (e.g., less than 80 microns, less than 60 microns, less than 50 microns, more than 20 microns, more than 30 microns, 20-80 microns, 20-60 microns, 30-50 microns, or other suitable thickness). Pressure sensitive adhesive layer 124 may have a thickness T3 of about 20 microns (e.g., less than 40 microns, less than 30 microns, more than 10 microns, more than 5 microns, 5-40 microns, 10-30 microns, or other suitable thickness). TAC layer 106 may have a thickness T4 of about 40 microns (e.g., less than 80 microns, less than 60 microns, less than 50 microns, more than 20 microns, more than 30 microns, 20-80 microns, 20-60 microns, 30-50 microns, or other suitable thickness). The thicknesses T2 and T4 of respective TAC layers 120 and 106 may be equal, may differ by less than 10% with respect to each other, may differ by less than 25% with respect to each other, may differ by more than 25% with respect to each other, or may have other suitable thicknesses (as examples). PVA layer 102 may have a thickness T5 of about 22 microns (e.g., less than 40 microns, less than 30 microns, more than 5 microns, more than 10 microns, 10-40 microns, 15-30 microns, or other suitable thickness).

In polarizer configurations of the types shown in FIGS. 10 and 11, other thicknesses may be used for the layers of material in the polarizer, other polymers can be used in place of the TAC films, PVA films, etc., other deformable adhesive layers can be used in place of pressure sensitive adhesive 124 (e.g., soft optically clear adhesive formed from a cured liquid adhesive precursor material, combinations of pressure sensitive adhesive and other adhesives, etc.), additional layers of material may be added (e.g., additional TAC films, additional adhesive layers, or other additional polymer layers, etc.). The configurations of FIGS. 10 and 11 are merely illustrative.

The foregoing is merely illustrative and various modifications can be made by those skilled in the art without departing from the scope and spirit of the described embodiments. The foregoing embodiments may be implemented individually or in any combination.

What is claimed is:

1. A polarizer, comprising:
    a first polymer layer, wherein the first polymer layer comprises a polyvinyl alcohol layer;
    a dichroic dye on the first polymer layer;
    a second polymer layer, wherein the second polymer layer comprises a tri-acetyl cellulose layer, and wherein the dichroic dye is interposed between the first and second polymer layers;
    a pressure sensitive adhesive layer on the second polymer layer, wherein the pressure sensitive adhesive layer has a thickness of 5-40 microns;
    a third polymer layer on the pressure sensitive adhesive layer, wherein the third polymer layer comprises a tri-acetyl cellulose, wherein the second polymer layer has a thickness of 20-80 microns and wherein the third polymer layer has a thickness of 20-80 microns; and
    an outermost layer on the third polymer layer.

2. The polarizer defined in claim 1 wherein the outermost layer comprises an inorganic layer.

3. The polarizer defined in claim 1 wherein the outermost layer comprises an antireflection layer.

4. The polarizer defined in claim 1 further comprising compensation films coupled to the first polymer layer.

5. A polarizer, comprising:
    a polyvinyl alcohol layer;
    a dichroic dye on the polyvinyl alcohol layer;
    a tri-acetyl cellulose layer, wherein the dichroic dye is interposed between the polyvinyl alcohol layer and the tri-acetyl cellulose layer;
    a polymer layer;
    an adhesive layer between the tri-acetyl cellulose layer and the polymer layer; and
    a hard coat layer between the tri-acetyl cellulose layer and the adhesive layer, wherein the hard coat layer forms a coating on the polymer layer.

6. The polarizer defined in claim 5, wherein the adhesive layer comprises a pressure sensitive adhesive layer.

7. The polarizer defined in claim 5 wherein the tri-acetyl cellulose layer has a thickness of 20-80 microns.

8. The polarizer defined in claim 7 wherein the polymer layer has a thickness of 20-80 microns.

9. The polarizer defined in claim 8 wherein the polymer layer is a layer of tri-acetyl cellulose.

10. The polarizer defined in claim 9 wherein the adhesive layer has a thickness of 10-30 microns.

11. The polarizer defined in claim 10 further comprising an antireflection layer on the polymer layer.

12. A display, comprising:
    upper and lower polarizer layers;
    a thin-film transistor layer between the upper and lower polarizer layers;
    a color filter layer between the upper and lower polarizer layers; and
    a layer of liquid crystal material between the thin-film transistor layer and the color filter layer, wherein the upper polarizer layer includes a first polymer layer, a second polymer layer, a dichroic dye on the first polymer layer between the first and second polymer layers, a third polymer layer, and an adhesive layer between the second and third polymer layers, wherein the third polymer layer and the second polymer layer have thicknesses of 20-80 microns.

13. The display defined in claim 12 wherein the first polymer layer comprises a polyvinyl alcohol layer and wherein the second polymer layer comprises a tri-acetyl cellulose layer.

14. The display defined in claim 13 wherein the dichroic dye comprises iodine, wherein the adhesive layer is formed on the second polymer layer, and wherein the third polymer layer comprises tri-acetyl cellulose.

15. The display defined in claim 14 wherein the adhesive layer comprises a pressure sensitive adhesive layer.

* * * * *